United States Patent [19]

Choi

[11] Patent Number: 5,603,101

[45] Date of Patent: Feb. 11, 1997

[54] METHOD OF AND APPARATUS FOR DISPLAYING TEMPERATURE ON A RADIO TELEPHONE

[75] Inventor: Jin-Gyu Choi, Seoul, Rep. of Korea

[73] Assignee: Hyundai Electronics Industries Co., Ltd., Kyonggi-Do, Rep. of Korea

[21] Appl. No.: 361,983

[22] Filed: Dec. 22, 1994

[30] Foreign Application Priority Data

Dec. 30, 1993 [KR] Rep. of Korea .................. 93-31191

[51] Int. Cl.$^6$ ......................................................... H04B 1/38
[52] U.S. Cl. .................. 455/89; 455/145; 455/154.1; 455/344; 379/58
[58] Field of Search ........................... 455/89, 90, 38.4, 455/145, 344, 346, 347, 351, 154.1, 158.4, 73, 84; 379/58, 61, 428, 433, 434

[56] References Cited

U.S. PATENT DOCUMENTS

| | | | |
|---|---|---|---|
| 5,159,315 | 10/1992 | Schultz et al. | 340/539 |
| 5,249,220 | 9/1993 | Moskowitz et al. | |
| 5,457,814 | 10/1995 | Myrskog et al. | 455/89 |
| 5,481,506 | 1/1996 | Kita | 368/10 |

Primary Examiner—Reinhard J. Eisenzopf
Assistant Examiner—Doris To
Attorney, Agent, or Firm—Morgan & Finnegan, L.L.P.

[57] ABSTRACT

A method of and an apparatus for displaying temperature on a radio telephone. The temperature apparatus includes a key pad for producing a temperature mode or a speech mode, a device for measuring current room or environment temperature, analog/digital converting device for converting current room or environment temperature into a digital value, and a microcomputer for storing the digital temperature value in a memory of the radio telephone. The method includes the steps of a) using key for determining whether a temperature mode is selected, b) reading current environment temperature through the temperature measuring device, and displaying the measured current temperature on a liquid crystal display for a predetermined time, c) stopping the temperature mode, and converting the temperature mode into a speech mode. The liquid crystal display and driving device for driving the liquid crystal display of the radio telephone is utilized for optionally displaying temperature or telephone numbers of transmitters and receivers, which is more cost effective. In addition, the temperature display apparatus of the present invention may be applied to a variety of microcomputer-bases systems, for example, computers or copying machines.

3 Claims, 2 Drawing Sheets

METHOD OF AND APPARATUS FOR DISPLAYING TEMPERATURE ON A RADIO TELEPHONE

BACKGROUND OF THE INVENTION

1. Field of the Invention

This invention relates to a method of and an apparatus for displaying current room or environmental temperature on a radio telephone, and particularly to a method of and an apparatus for displaying current or environmental temperature on a radio telephone by using a dial key pad on a portable radiophone receiver or on a fixed radiophone base of the radio telephone during a non-speaking mode.

2. Description of the Conventional Art

In general, the radio telephone is a radio transmitter and radio receiver used together for two-way telephone communication by radio. Instead of a cord connecting a telephone receiver and a telephone base used in a conventional standard table telephone, the radio telephone utilizes radio.

However, the dialing, and speech paths formed by a telephone transmitter and a telephone receiver of the radio telephone when connection of a call is achieved, the same as those of the conventional standard table telephone.

The transmitter and receiver, and the connecting cord of the conventional standard table telephone are respectively replaced by a portable telephone receiver and high frequency signals, whereby the convenience of telephone communication and mobility of the radio telephone is achieved.

In the conventional radio telephone, a portable radiophone receiver or a fixed radiophone base has an LCD used for speech purposes only. The LCD displays only the receiver's telephone numbers.

Accordingly, a separate temperature gauge is needed for measuring room or environment temperature, such as a digital temperature gauge. The digital temperature gauge includes a separate LCD for displaying temperature and means for driving the LCD.

SUMMARY OF THE INVENTION

One of the primary objects of the present invention is to solve the problems encountered in the conventional art.

Another of the objects of the present invention is to provide a method of and an apparatus for displaying, on an LCD of a radio telephone, both current room or environment temperature, and telephone numbers of transmitters and receivers, by utilizing the LCD and means for driving the LCD.

A further object of the present invention is to provide a method of measuring current room temperature and displaying the measured room temperature on the LCD during a non-speech mode, and of making the temperature measuring mode transition automatically to an off state.

A method of displaying current or environment temperature on an LCD of a radio telephone according to the present invention comprises: a) using a key pad on a radiophone receiver or on a radiophone base for determining whether a temperature mode is selected; b) using temperature measuring means for reading temperature and for displaying the measured room temperature on an LCD for a predetermined time, when the temperature mode has been selected in step (a); and c) stopping the temperature mode after the predetermined time period has lapsed, and converting the temperature mode into a speech mode.

An apparatus for displaying temperature on a radio telephone, the radio telephone comprising a memory and an LCD, said temperature display device comprising: a key pad for selecting a temperature mode or a speech mode; means for measuring current room or environment temperature; analog/digital converting means for sampling said current room or environment temperature measured by said temperature measuring means, and converting said sampled current room or environment temperature into a digital value; and a microcomputer for reading said digital temperature value obtained by said analog/digital converting means, depending on said temperature mode selected by said key pad, for storing said digital temperature value in said memory, for displaying said current room or environment temperature on said LCD, and for controlling overall operation of said radio telephone when said speech mode is selected.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
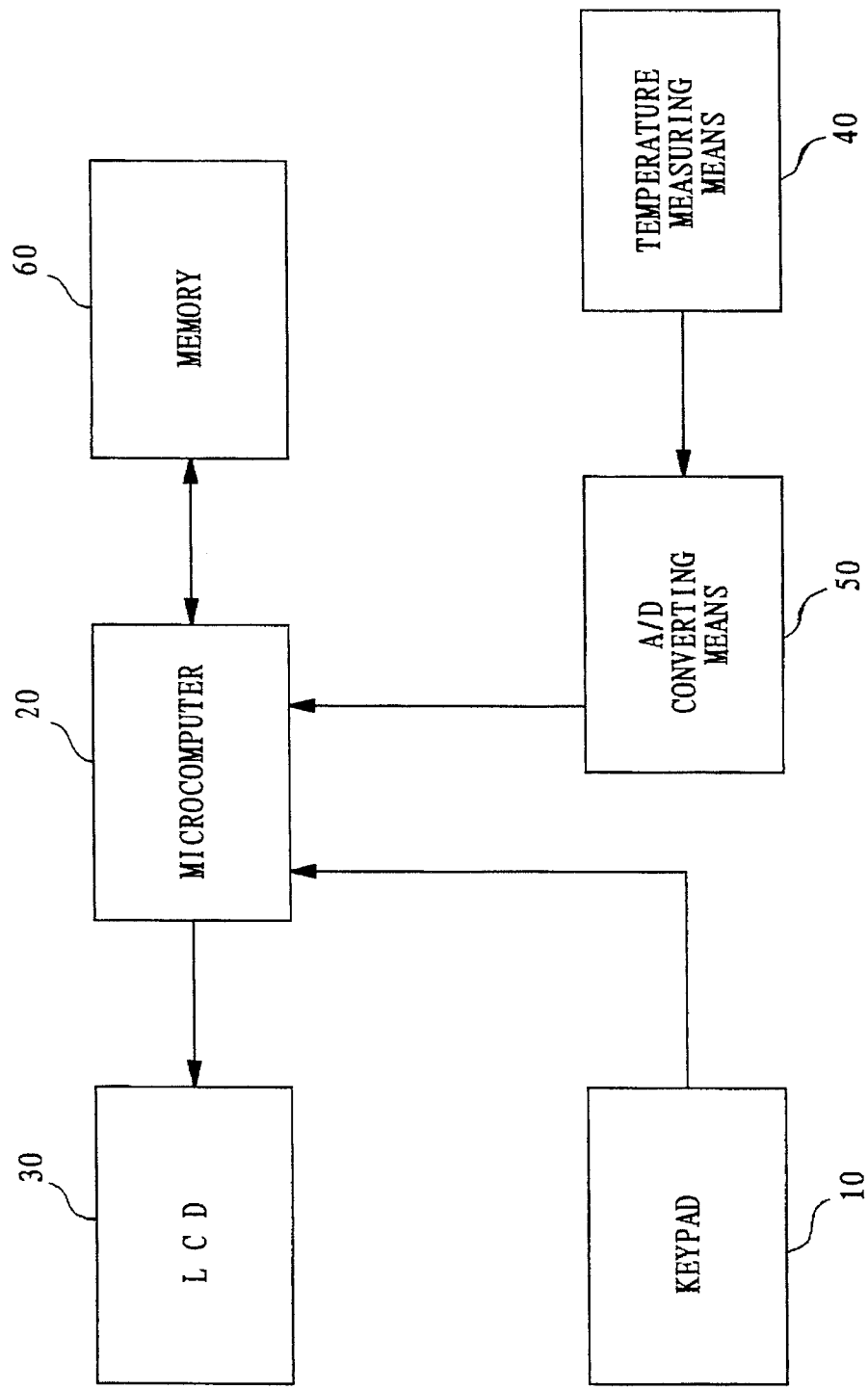
FIG. 1 is block diagram of room temperature display means of a radio telephone of the present invention.

FIG. 1 is a block diagram of room temperature display means of a radio telephone according to the present invention.

As shown in FIG. 1, a temperature measuring section 40 is located at a suitable location in the radio telephone of the present invention, for detecting environment temperature and for generating electrical signals corresponding to the environment temperature. An analog/digital converting section 50 samples an analog electrical signal corresponding to the temperature detected by the temperature measuring section 40 and then converts the analog electrical signal into a digital signal. A key pad 10 selectively inputs temperature mode, speech mode or other various functions. A microcomputer (or 'micom') 20 derives current room temperature by comparing the digital temperature data value which has been measured by the temperature measuring section 40, depending on key data selected by the key pad 10, with reference temperature data value which is stored in a memory 60. The micom 20 also controls overall operation of the radio telephone or the room temperature display apparatus of the present invention. An liquid crystal display ('LCD') 30 displays the current room temperature obtained by the micom. In addition, the LCD 30 displays telephone numbers during a speaking mode.

Figure 2:
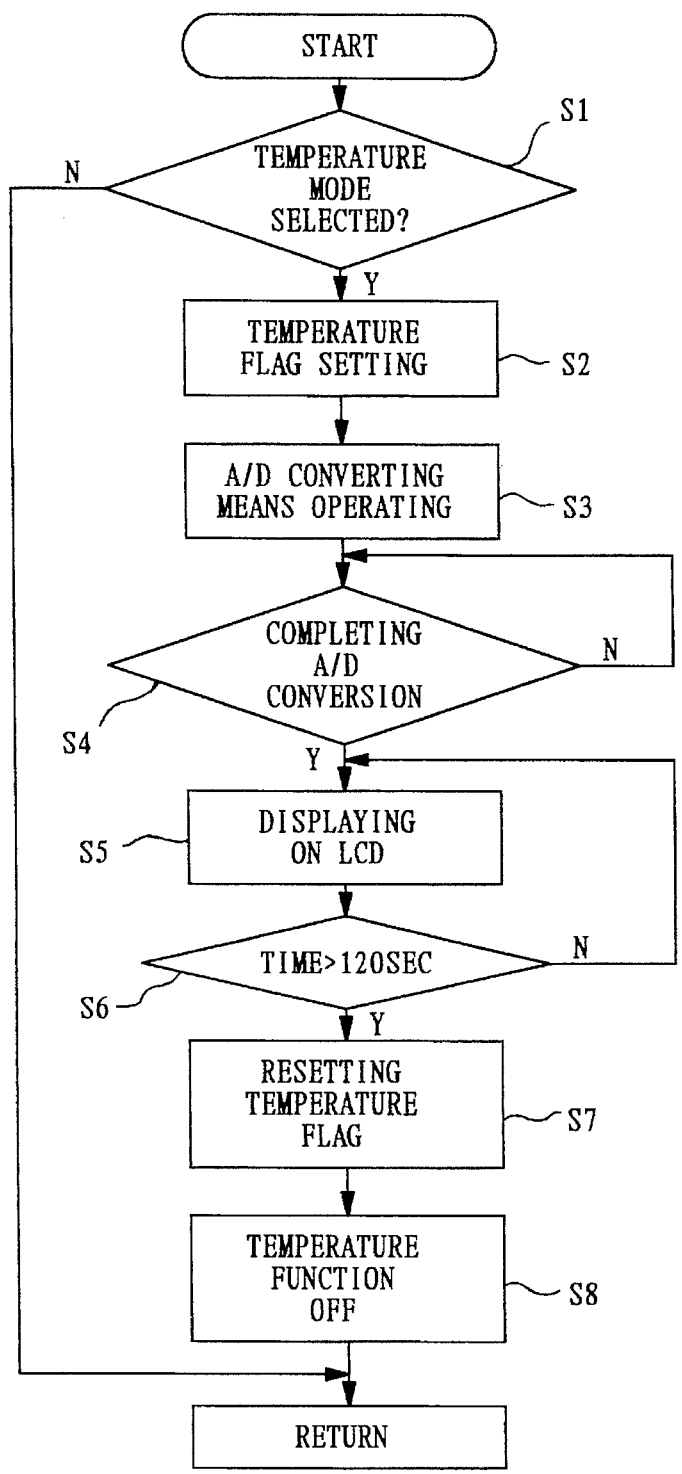
FIG. 2 is a flow chart of a process of FIG. 1.

FIG. 2 is a flow chart of a method of displaying temperature on the LCD of the radio telephone according to the present invention in FIG. 1. The method comprises:

a first step (S1) of interrogating the key pad 10 and determining whether the temperature mode is selected;

a second step (S2) of setting a temperature flag for change of state, when the temperature mode has been selected in step (S1);

a third step (S3) of operating the analog/digital converting section 50 for converting the current room temperature measured by the temperature measuring section 40 into the digital value;

a fourth step (S4) of determining whether the conversion into the digital by the analog/digital converting section 50 is completed;

a fifth step (S5) when the analog-to-digital conversion has been completed in step (S4) of storing the digital in the memory 60, while displaying the current room temperature on the LCD 30 for a predetermined display time period, for example, of 120 sec;

a sixth step (S6) of determining whether the predetermined display time period of the room temperature has lapsed;

a seventh step (S7) of resetting the state-conversion temperature flag for conversion of state, when the predetermined time has lapsed in step (S6); and a eighth step (S8) of stopping temperature display on the LCD and converting the temperature into the speaking mode.

Referring now more particularly to FIGS. 1 and 2, in step (S1), when a user selects the temperature mode by using the key pad 10 during usage of the radio telephone through the key pad 10, the microcomputer 20 scans the key pad 10 periodically for determining whether the temperature mode is selected.

In step (S2), when the temperature has been selected in step (S1), the temperature flag is set for conversion of state.

In step (S3), the temperature measuring section 40 located at a suitable position in the radio telephone of the present invention measures the current room temperature, and inputs the electrical signal of the current room temperature to the analog/digital conversion section 50.

In step (S4), the analog/digital conversion section 50 is operated by the micom 20 for converting the input electrical temperature signal into the digital signal, and inputs the converted digital signal to the microcomputer 20. Then, the microcomputer 20 determines whether the conversion into a digital temperature value by the analog/digital conversion is completed, and reads the digital temperature value continuously until the conversion into the digital temperature is finished.

In step (S5), when the conversion into the digital is completed, read-out current temperature data is stored in the memory 60, and the microcomputer reads out the reference temperature change value stored in the memory 60 and performs an operation for comparing the measured current room temperature data value with the reference temperature change value and obtains the real room temperature. Thereafter, the obtained real room temperature is displayed for a predetermined time, for example, for 120 sec on the display 30.

In step (S6), it is determined whether the predetermined display time period of the room temperature display has lapsed.

In step (S7), when the predetermined display time period of the room temperature display lapses in step (S6), the temperature flag is rest. Then, the current room temperature display on the LCD 30 stops.

In step (S8), conversion into the speaking mode of voice transmission and reception is carried out, the speaking mode being the function of the radio telephone of the present invention.

That is, when it is desired to display current room temperature, the temperature mode on the key pad 10 is selected. The selection is determined by the micom 20. The current room temperature is displayed on the LCD 30 by performing operation of the level of the temperature gauge which is applied from the temperature measuring section 40 through the analog/digital conversion section 50.

When the temperature mode for temperature display is not selected, the regular display function of the radio telephone is carried out.

As described above, a temperature display function is applied to a conventional radio telephone so that desirable room temperature may be maintained and multi-functioning radio telephone may be obtained.

Furthermore, an LCD and driving means for driving the LCD of the radio telephone may be utilized for optionally displaying temperature or telephone numbers of transmitters and receivers, which is more cost effective.

In addition, the temperature display apparatus of the present invention may be applied to a variety of microcomputer-based systems, for example, computers or copying machines.

While particular embodiments of the present invention have been shown and described, it will be obvious to those skilled in the art that changes and modifications may be made without departing from the invention in its broader aspects.

Therefore, the aim in the appended claims is to cover all such changes and modifications as fall within the true spirit and scope of the invention.

The matter set forth in the foregoing descriptions and accompanying drawings is offered by way of illustration only and not as a limitation. The actual scope of the invention is intended to be defined in the following claims when viewed in their proper perspective based on the conventional art.

What is claimed is:

1. A method of displaying temperature on a radio telephone, the radio telephone comprising a key pad for selecting temperature, speech mode, or other various functions, means for measuring current environment or room temperature for producing an electrical signal corresponding to said environment or room temperature and an liquid crystal display for displaying said current environment or room temperature, the method including the steps of:

a) using said key pad for determining whether a temperature mode is selected:

b) when said temperature mode has been selected in step (a), reading said current environment or room temperature through said temperature measuring means, and displaying said measured current temperature on said liquid crystal display for a predetermined time; and c) after said predetermined time has lapsed, stopping said temperature mode, and converting said temperature mode into a speech mode.

2. A method according to claim 1, wherein said predetermined time is 120 sec.

3. An apparatus for displaying temperature for use in a radio telephone, the radio telephone comprising a memory and liquid crystal display, said temperature display apparatus comprising:

a key pad for selecting a temperature mode or a speech mode;

means for measuring current room or environment temperature;

analog/digital converting means for sampling said current room or environment temperature measured by said temperature measuring means, and converting said sampled current room or environment temperature into a digital value; and a microcomputer for reading said digital temperature value obtained by said analog/digital converting means, depending on said temperature mode selected via said key pad, for storing said digital temperature value in said memory, for displaying said current room or environment temperature on said liquid crystal display, and for controlling overall operation of said radio telephone when said speech mode is selected.

* * * * *